United States Patent
Lee

(10) Patent No.: US 11,972,435 B2
(45) Date of Patent: Apr. 30, 2024

(54) METHOD, APPARATUS, AND SYSTEM FOR TRANSMITTING AND RECEIVING INFORMATION BY USING QR CODE

(71) Applicant: DOOBITNARAESOFT CO., LTD., Seoul (KR)

(72) Inventor: Dong Koo Lee, Gwangju-si (KR)

(73) Assignee: DOOBITNARAESOFT CO., LTD., Seoul (KR)

(*) Notice: Subject to any disclaimer, the term of this patent is extended or adjusted under 35 U.S.C. 154(b) by 328 days.

(21) Appl. No.: 17/561,124

(22) Filed: Dec. 23, 2021

(65) Prior Publication Data
US 2022/0114596 A1 Apr. 14, 2022

Related U.S. Application Data

(62) Division of application No. 17/296,894, filed as application No. PCT/KR2019/013222 on Oct. 8, 2019, now Pat. No. 11,367,078.

(30) Foreign Application Priority Data
Nov. 26, 2018 (KR) ........................ 10-2018-0147032

(51) Int. Cl.
*G06Q 20/40* (2012.01)
*G06Q 20/20* (2012.01)
(Continued)

(52) U.S. Cl.
CPC ....... *G06Q 20/40975* (2013.01); *G06Q 20/20* (2013.01); *G06Q 20/3276* (2013.01); *G06Q 20/3829* (2013.01); *H04L 9/32* (2013.01)

(58) Field of Classification Search
CPC ............... G06Q 20/20; G06Q 20/3276; G06Q 20/3829; G06Q 20/40975; H04L 9/32;
(Continued)

(56) References Cited

U.S. PATENT DOCUMENTS

2012/0203701 A1* 8/2012 Ayuso de Paul ... H04L 65/1069
709/227
2013/0019096 A1* 1/2013 Palzer .................. H04W 12/06
713/168
(Continued)

OTHER PUBLICATIONS

Y. Jin and M. Tomoishi, "A Secure End-to-End Key Exchange Mechanism by Cooperation of Multiple Devices Using QR Codes," 2019 29th International Telecommunication Networks and Applications Conference (ITNAC), Auckland, New Zealand, 2019, pp. 1-7, doi: 10.1109/ITNAC46935.2019.9078020. (Year: 2019).*
(Continued)

*Primary Examiner* — Michael Simitoski
(74) *Attorney, Agent, or Firm* — Quantum Patent Law Firm; Seongyoune Kang

(57) ABSTRACT

The present invention provides a method, an apparatus, and a system for transmitting and receiving information by using a QR code. The method can receive a first QR code including second terminal identification information from a second terminal, transmit the second terminal identification information to a server, receive, from the server, encryption information of the second terminal on the basis of the second terminal identification information, generate first terminal encryption information by using encryption information of the second terminal to encrypt encryption information of a first terminal, transmit the first terminal encryption information to the second terminal, receive, from the second terminal, a second QR code that is generated on the basis of the first terminal encryption information and that includes information data, and obtain the information data by using decryption information of the first terminal to decrypt the second QR code.

3 Claims, 8 Drawing Sheets

(51) Int. Cl.
*G06Q 20/32* (2012.01)
*G06Q 20/38* (2012.01)
*H04L 9/32* (2006.01)

(58) Field of Classification Search
CPC ....... H04L 9/0838; H04L 9/0819; H04L 9/08; H04L 9/0816; H04L 63/061; H04L 63/0869; H04W 12/06; H04W 12/50; H04W 12/04; H04W 12/0431; H04W 12/0471; H04W 12/63; H04W 12/77; H04W 4/70; H04W 4/80; H04W 76/10; H04W 76/14; G06F 21/606
See application file for complete search history.

(56) References Cited

U.S. PATENT DOCUMENTS

| | | | | |
|---|---|---|---|---|
| 2013/0276079 | A1* | 10/2013 | Foulds | H04L 63/08 726/7 |
| 2013/0282590 | A1* | 10/2013 | Rajarethnam | G06Q 20/3276 705/71 |
| 2014/0208384 | A1* | 7/2014 | Youssefian | H04L 63/0869 726/3 |
| 2015/0178721 | A1* | 6/2015 | Pandiarajan | G06K 19/06112 705/64 |
| 2016/0036809 | A1* | 2/2016 | Bhimanaik | H04L 63/102 726/4 |
| 2016/0087949 | A1* | 3/2016 | Deleeuw | H04W 12/50 713/170 |
| 2016/0212126 | A1* | 7/2016 | Sadacharam | G06Q 20/3276 |
| 2016/0260003 | A1* | 9/2016 | Hill | G06K 19/06028 |
| 2016/0314462 | A1* | 10/2016 | Hong | H04L 63/083 |
| 2017/0048062 | A1* | 2/2017 | Polak | H04L 9/0866 |
| 2017/0244555 | A1* | 8/2017 | Beiter | H04L 9/3226 |
| 2017/0250974 | A1* | 8/2017 | Antonyraj | H04W 12/50 |
| 2019/0222420 | A1* | 7/2019 | Maezawa | H04L 9/083 |

OTHER PUBLICATIONS

A. T. Purnomo, Y. S. Gondokaryono and C.-S. Kim, "Mutual authentication in securing mobile payment system using encrypted QR code based on Public Key Infrastructure," 2016 6th International Conference on System Engineering and Technology (ICSET), Bandung, Indonesia, 2016, pp. 194-198. (Year: 2016).*

* cited by examiner

[FIG. 1]
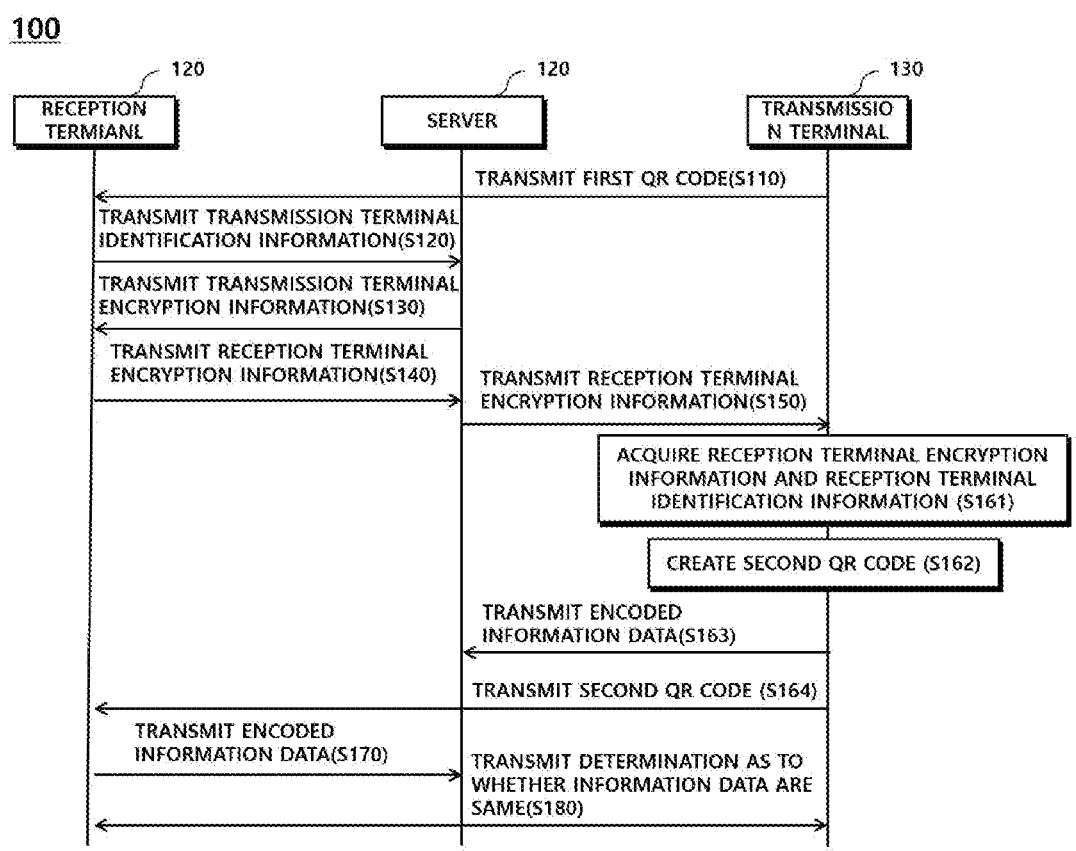

[FIG. 2]
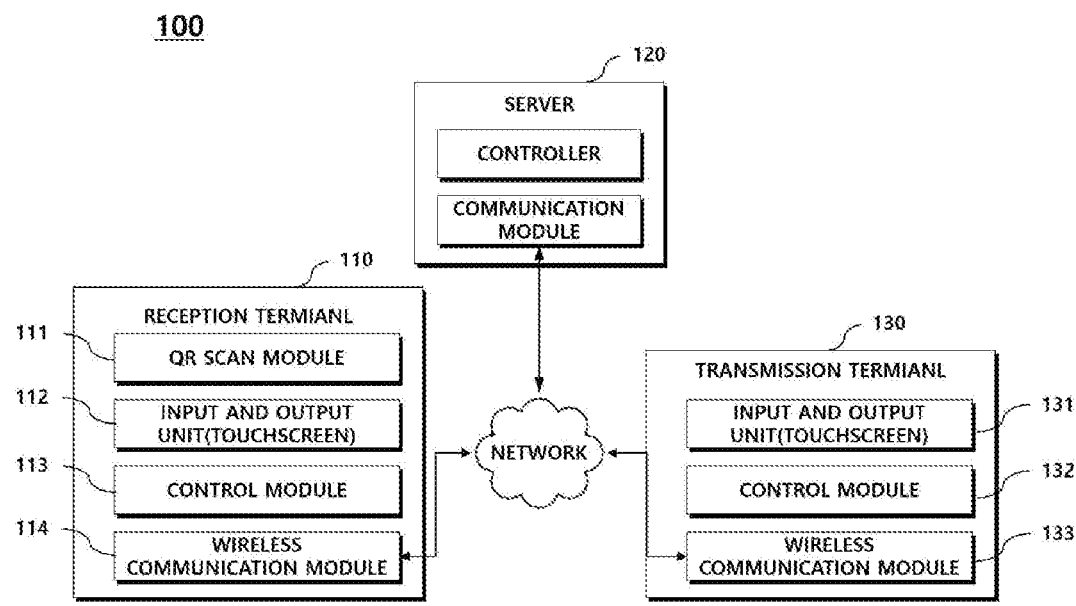

【FIG. 3】
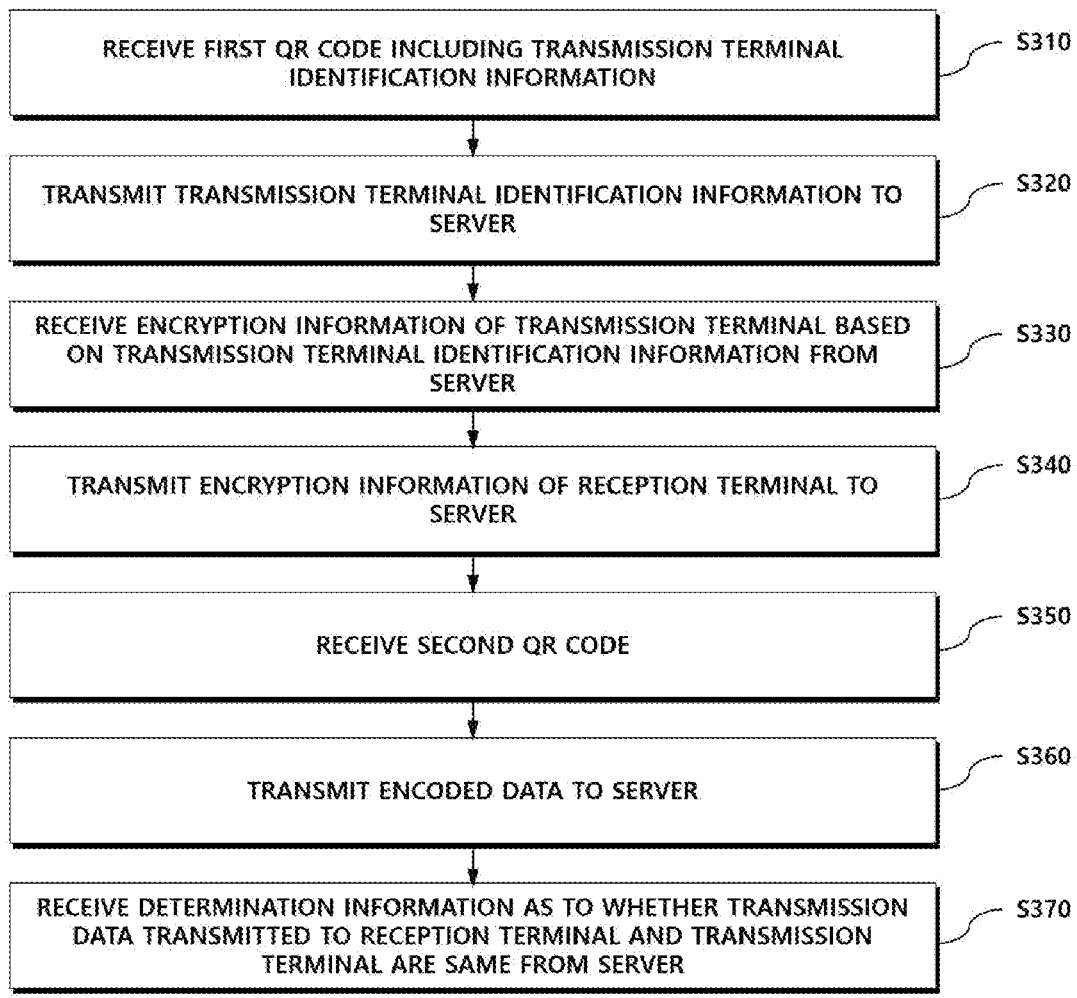

[FIG. 4]
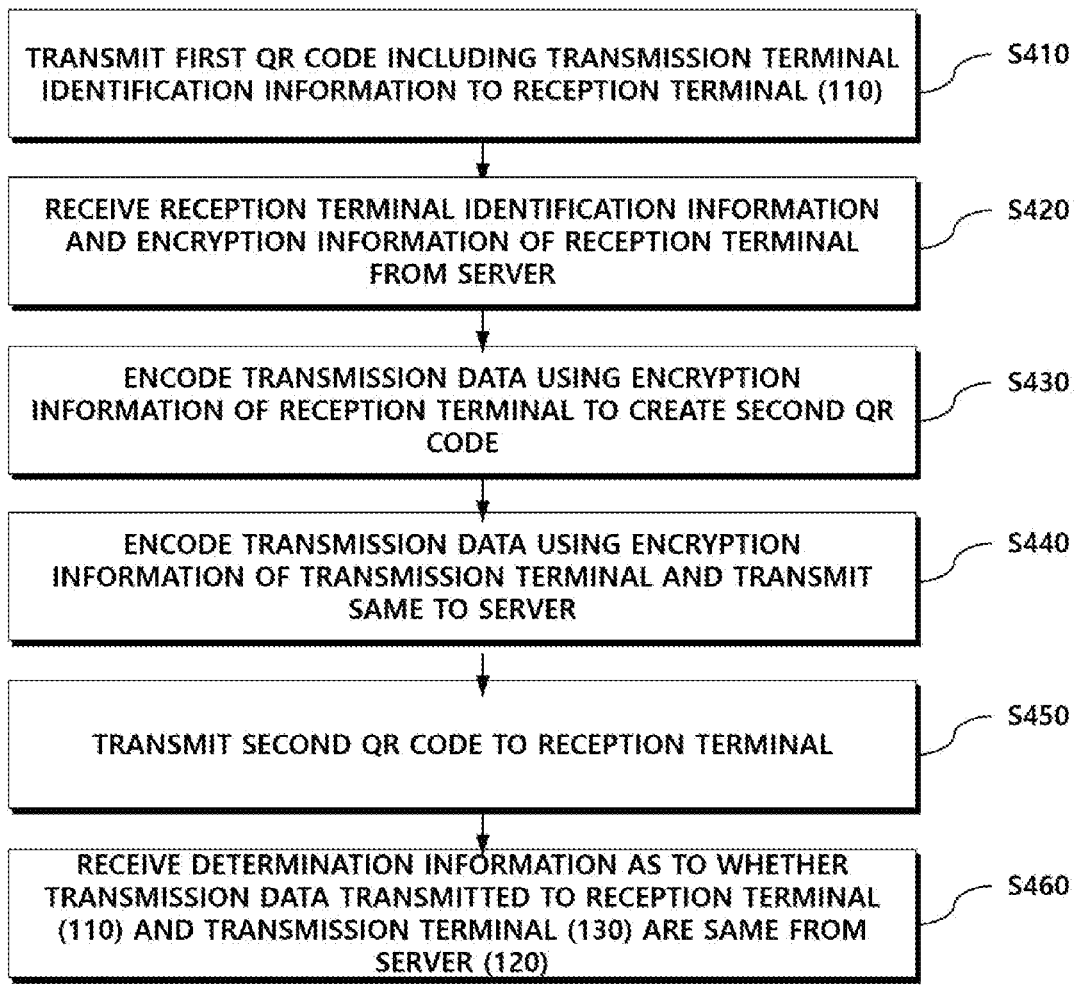

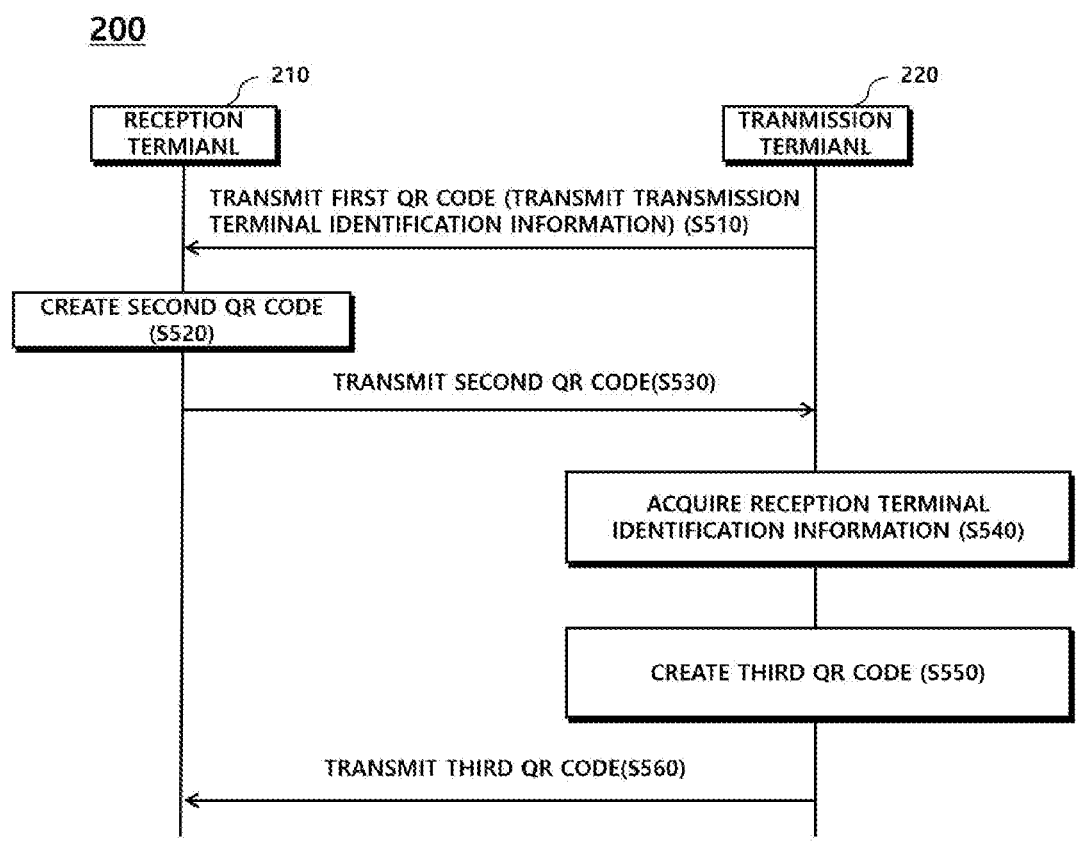

【FIG. 6】
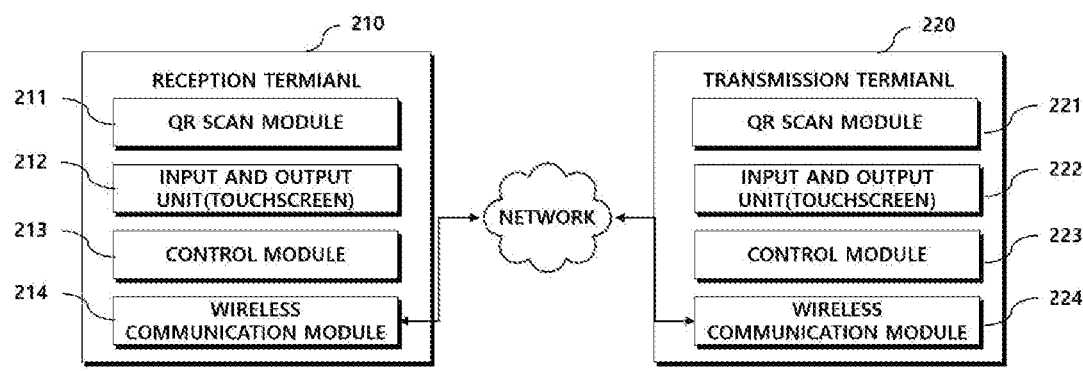

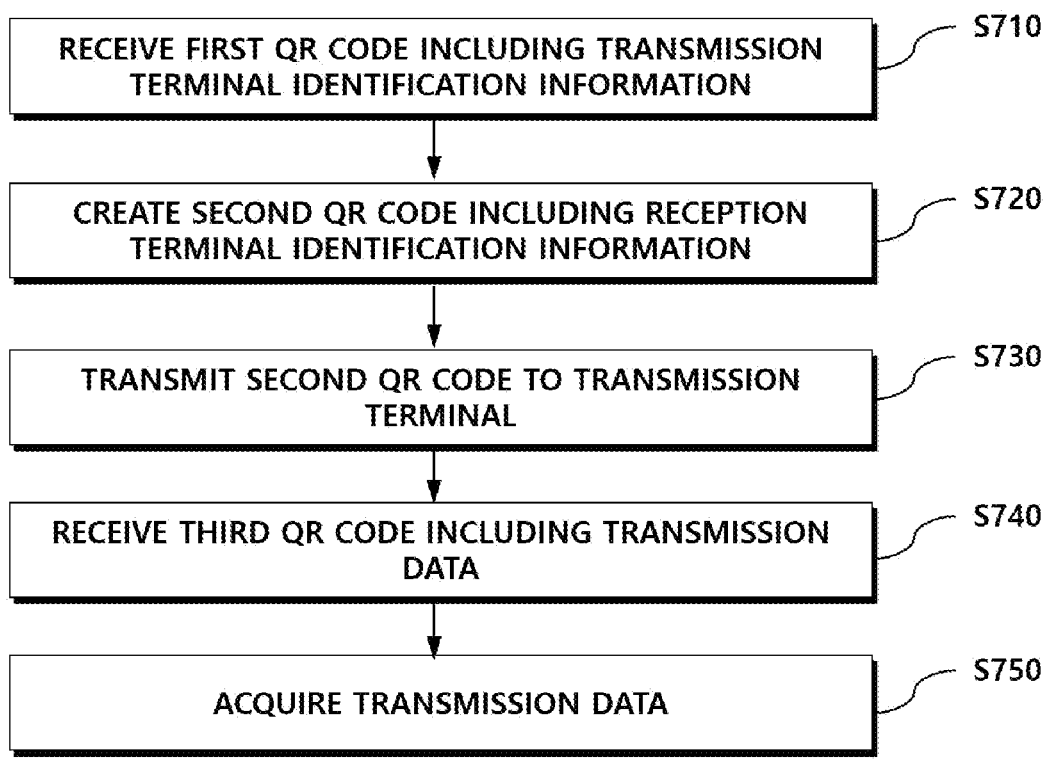

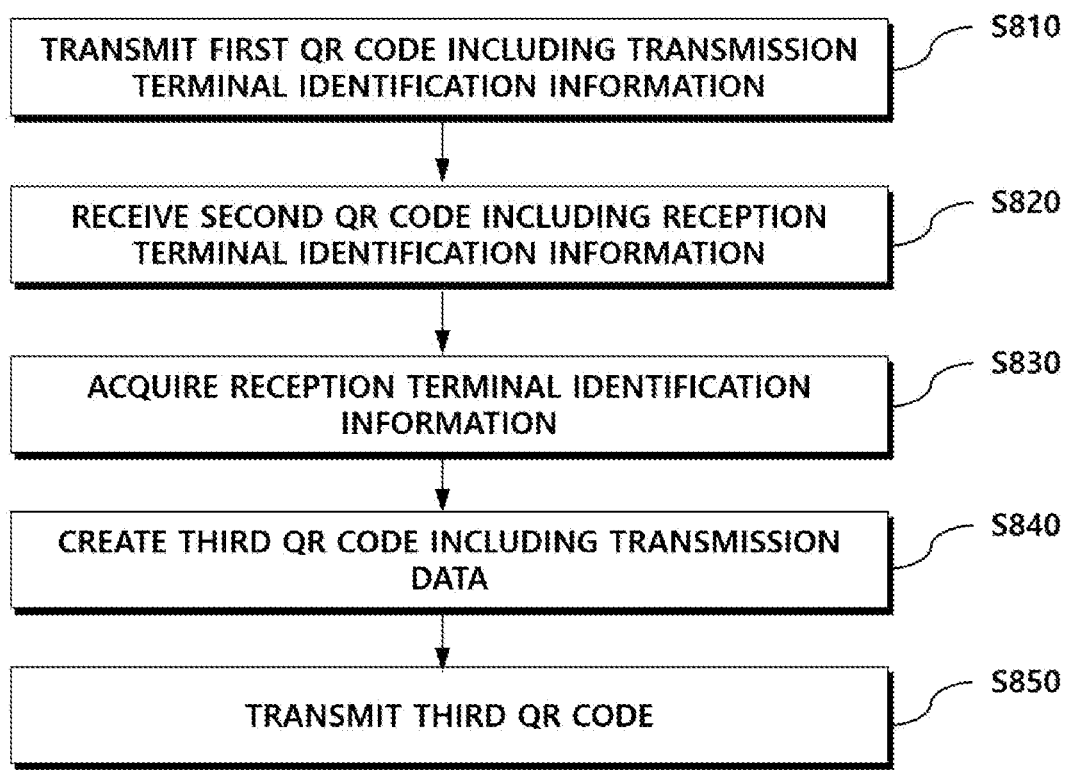

METHOD, APPARATUS, AND SYSTEM FOR TRANSMITTING AND RECEIVING INFORMATION BY USING QR CODE

CROSS-REFERENCE TO RELATED APPLICATIONS

This patent application is a divisional application of U.S. patent application Ser. No. 17/296,894, filed May 25, 2021, which is the U.S. national stage application of International Application No. PCT/KR2019/013222, filed Oct. 8, 2019 and the entire contents of which are incorporated herein by reference, which claims priority to Korean Application No. 10-2018-0147032, filed Nov. 26, 2018, and the entire contents of which are incorporated herein by reference.

TECHNICAL FIELD

The present invention relates to an information transmission and reception method, apparatus, and system using a QR code, and more particularly to a QR information transmission and reception method, apparatus, and system in an apparatus having no QR identification module and a QR information transmission and reception method, apparatus, and system using a QR code in inter-terminal communication.

BACKGROUND ART

In general, various electronic devices have been manufactured with development of electronic communication technology, and various devices, such as mobile phones and smartphones, have been widely popularized. To date, smartphones have been widely popularized, and users have performed various tasks, such as telephone conversation, e-mail, and wireless Internet, using the same.

Recent smartphones have technical advantages in that users are capable of directly downloading and installing applications to configure the smartphones like their own personal computers (PCs). With evolution in the concept of smartphones, various kinds of applications for smartphones have been developed, sold, and used in smartphone-related markets.

A QR code is a two-dimensional barcode having a matrix form configured to show information using a black and white lattice pattern. The QR code has been variously utilized in various fields due to an advantage thereof in that it is possible to store data having a larger size than a general barcode configured to store numerical information or character information in one direction. In general, an image may be captured from the QR code through a camera provided in a smartphone or a device having a separate reader, whereby it is possible to read data stored in the QR code. That is, it is possible for any user who has a means configured to read a standard QR code to retrieve data in the QR code.

However, a method of encoding and decoding data recorded in a conventional QR code has not been provided, whereby there is a limitation in storing data sensitive to security. For example, in the case in which information of a recipient is recorded in mail using a QR code, the information may be scanned by any person other than a mail courier using a QT code reader, whereby the information of the recipient may leak.

Meanwhile, in various kinds of stores, such as restaurants, fast food stores, and coffee shops, a portion of an in-store order system is automated based on a POS terminal in order to rapidly take a large number of orders. One representative example is a system in which an order identification device, such as a so-called vibrating buzzer, is provided to an order customer and when manufacture of an ordered commodity is completed, the customer is informed of the same through the order identification device such that the customer takes the ordered commodity. However, time necessary for payment in such stores is not shortened at all, and personnel expenses are incurred since some service workers must stand by for payment.

To date, credit card payment or mobile payment in offline member stores (including public institutions) has been performed through an MS reader of a CAT terminal, an ATM, or a POS, RFIC (IC card), NFC, or Bluetooth. In this system, however, a wired communication network (telephone or Internet) for agents of each VAN company is used in most cases. In this case, information leaks through a device in each member store or through a management network of each agent, whereby security management of customers becomes an issue. For example, information of a card attached to a terminal may leak, or information may leak through a computer management network of a VAN agent. Furthermore, a reduction in commission of a member store by a credit card company is difficult due to payment of a VAN fee to the VAN company. In addition, conventionally, payment time delay or payment omission often occurs due to poor access, which is a shortcoming of wired Internet.

Furthermore, conventionally, current VAN agents face blood-drying situations due to rebate in a VAN market caused by overheated competition in a CAT terminal and POS supply market.

DISCLOSURE

Technical Problem

It is an object of the present invention to provide a QR information transmission and reception method available in a conventional POS system having no QR identification module or having a limitation in using a camera.

It is another object of the present invention to provide a QR information transmission and reception method available in a field in which data processing using a QR code between terminals is necessary without the intervention of a server.

The objects of the present invention are not limited to the objects mentioned above, and other unmentioned objects will be clearly understood by those skilled in the art based on the following description.

Technical Solution

An information transmission and reception method using a QR code according to an aspect of the present invention to accomplish the above objects includes receiving a first QR code including identification information of a second terminal from the second terminal, transmitting the identification information of the second terminal to a server, receiving encryption information of the second terminal corresponding to the identification information of the second terminal from the server, creating first code information, the first code information being information obtained by encoding encryption information of a first terminal using the encryption information of the second terminal, transmitting the first code information to the second terminal, receiving a second QR code including information data encoded using the encryption information of the first terminal from the second terminal, decoding the information data recorded in the second QR code using decryption information of the first terminal to acquire the information data, encoding the information data using the encryption information of the second terminal and transmitting the encoded information data to the server, and receiving determination information from the server, wherein the determination information is determination information as to whether the information data transmitted from the first terminal to the server and the information data transmitted from the second terminal to the server are identical to each other, and the receiving determination information from the server includes decoding, by the server, the information data received from the first terminal using decryption information of the second terminal and decoding, by the server, the information data received from the second terminal using the decryption information of the second terminal.

In addition, the information transmission and reception method using the QR code according to the present invention may further include confirming that the information data are correctly received in the case in which the determination information as to whether the information data are identical to each other indicates that the information data are identical to each other and confirming that the information data are not correctly received in the case in which the determination information as to whether the information data are identical to each other indicates that the information data are not identical to each other.

In addition, the information transmission and reception method using the QR code according to the present invention may further include receiving the first QR code from the second terminal again in the case in which the information data are not correctly received.

An information transmission and reception method using a QR code according to another aspect of the present invention to accomplish the above objects includes transmitting a first QR code including identification information of a second terminal, receiving first code information, the first code information being information obtained by encoding encryption information of a first terminal using encryption information of the second terminal based on the first QR code, decoding the first code information using decryption information of the second terminal to acquire the encryption information of the first terminal, encoding information data using the encryption information of the first terminal to create encoded information data, creating a second QR code based on the encoded information data, transmitting the second QR code to the first terminal, encoding the information data using the encryption information of the second terminal and transmitting the encoded information data to a server, and receiving determination information from the server, wherein the determination information is determination information as to whether the information data transmitted from the first terminal to the server and the information data transmitted from the second terminal to the server are identical to each other, and the receiving determination information from the server includes decoding, by the server, the information data received from the first terminal using the decryption information of the second terminal and decoding, by the server, the information data received from the second terminal using the decryption information of the second terminal.

In addition, the information transmission and reception method using the QR code according to the present invention may further include confirming that the information data are correctly received in the case in which the determination information as to whether the information data are identical to each other indicates that the information data are identical to each other and confirming that the information data are not correctly received in the case in which the determination information as to whether the information data are identical to each other indicates that the information data are not identical to each other.

In addition, the information transmission and reception method using the QR code according to the present invention may further include transmitting the first QR code from the first terminal again in the case in which the information data are not correctly received.

Also, in the information transmission and reception method using the QR code according to the present invention, the transmitting the first code information to the second terminal may include transmitting the first code information to the server and transmitting, by the server, the first code information to the second terminal.

Advantageous Effects

An information transmission and reception method, apparatus, and system using a QR code according to the present invention have an advantage in that a process of creating and transmitting a QR code by a reception terminal is substituted using a server during a process of transmitting and receiving information of the reception terminal, whereby the information transmission and reception method, apparatus, and system are applicable to a conventional POS system having no QR identification module or having a limitation in using a camera (for example, a system using a general desktop PC or a terminal having a display device that has been already used), whereby it is possible to greatly secure extensibility.

In addition, the information transmission and reception method, apparatus, and system using the QR code according to the present invention have an advantage in that the information transmission and reception method, apparatus, and system are applicable to a field in which data processing using a QR code between terminals is necessary without the intervention of a server and are applicable to a field in which encryption is omitted and thus no security is necessary, whereby the information transmission and reception method, apparatus, and system are capable of being alternatively utilized in a field in which security is used for access authentication or login using a simple bidirectional data transmission and reception method or in a field in which there is a limitation in using wireless short range communication (NFC or RFID).

Also, in the information transmission and reception method, apparatus, and system using the QR code according to the present invention, information data or payment information are cross-checked by a terminal of a member store even in the state in which a user's smartphone is hacked, whereby safe information transmission is possible.

Also, in the information transmission and reception method, apparatus, and system using the QR code according to the present invention, security is reinforced while ease of use and rapid use, which are merits of conventional QR code payment, are maintained.

The effects of the present invention are not limited to the effects mentioned above, and other unmentioned effects will be clearly understood by those skilled in the art from the following description.

DESCRIPTION OF DRAWINGS

FIG. 1 is view showing an information transmission and reception system using a QR code including a transmission terminal having no QR identification module according to an embodiment of the present invention.

FIG. 2 is view showing components of a reception terminal, a server, and the transmission terminal included in the information transmission and reception system using the QR code including the transmission terminal having no QR identification module according to the embodiment of the present invention.

FIG. 3 is view showing the operation of the reception terminal of the information transmission and reception system using the QR code including the transmission terminal having no QR identification module according to the embodiment of the present invention.

FIG. 4 is view showing the operation of the transmission terminal of the information transmission and reception system using the QR code including the transmission terminal having no QR identification module according to the embodiment of the present invention.

FIG. 5 is view showing an information transmission and reception system using a QR code in inter-terminal communication according to an embodiment of the present invention.

FIG. 6 is view showing components of a reception terminal, a server, and a transmission terminal included in the information transmission and reception system using the QR code in inter-terminal communication according to the embodiment of the present invention.

FIG. 7 is view showing the operation of the reception terminal of the information transmission and reception system using the QR code in inter-terminal communication according to the embodiment of the present invention.

FIG. 8 is view showing the operation of the transmission terminal of the information transmission and reception system using the QR code in inter-terminal communication according to the embodiment of the present invention.

BEST MODE

Advantages and features of the present invention and a method of achieving the same will be more clearly understood from embodiments described below with reference to the accompanying drawings. However, the present invention is not limited to the following embodiments but may be implemented in various different forms. The embodiments are provided merely to complete disclosure of the present invention and to fully provide those skilled in the art to which the present invention pertains with the category of the invention. The present invention is defined only by the category of the claims.

The terms used in this specification are provided only to explain embodiments, but are not intended to restrict the present invention. In this specification, a singular representation may include a plural representation unless particularly mentioned. It will be further understood that the terms "comprises" and/or "comprising," when used in this specification, specify the presence of stated elements, but do not preclude the presence or addition of one or more other elements. Wherever possible, the same reference numbers will be used throughout the specification to refer to the same elements, and "and/or" includes each of the mentioned elements and one or more combinations thereof. Although the terms "first," "second," etc. may be used herein to describe various elements, these elements should not be limited by these terms. These terms are only used to distinguish one element from another. Therefore, a first element could be termed a second element within a technical idea of the present invention.

Unless otherwise defined, all terms (including technical and scientific terms) used in this specification have the same meaning as commonly understood by those skilled in the art to which the present invention pertains. In addition, terms defined in commonly used dictionaries will not be interpreted in an idealized or overly formal sense unless particularly clearly defined.

Hereinafter, embodiments of the present invention will be described in detail with reference to the accompanying drawings.

FIG. 1 is view showing an information transmission and reception system using a QR code including a transmission terminal having no QR identification module according to an embodiment of the present invention.

Referring to FIG. 1, the information transmission and reception system 100 using the QR code including the transmission terminal having no QR identification module according to the embodiment of the present invention (hereinafter referred to as an "information transmission and reception system including an apparatus having no QR identification module") may include a reception terminal 110, a server 120, and a transmission terminal 130 having no QR identification module.

The information transmission and reception system 100 including the apparatus having no QR identification module is configured to scan a QR code such that the reception terminal 110 acquires information data transmitted from the transmission terminal 130 having no QR identification module. The information transmission and reception system including the apparatus having no QR identification module may transmit not only information data but also encryption information used to encode the information data during an information transmission and reception process and decryption information through the QR code.

In an embodiment, in the information transmission and reception process, information data may be encoded based on an RSA encryption system and may then be transmitted. In addition, not only information data but also encryption information used for encryption or decryption information may be encoded and may then be transmitted. That is, in the present invention, a target to be encoded is not limited to information data, and encryption information or decryption information may be a target to be encoded. In a concrete example, encryption information of the reception terminal 110 may be encoded using encryption information of the transmission terminal 130 and may then be transmitted. Since the encryption information of the reception terminal 110 is not transmitted intact but is encoded using encryption information of the transmission terminal 130 and is then transmitted, as described above, decryption information corresponding to the encryption information of the transmission terminal 130 must be provided to acquire the encryption information of the reception terminal 110, whereby it is possible to further strengthen security.

The reception terminal 110 is a terminal configured to receive information data in the information transmission and reception system 100 including the apparatus having no QR identification module. Meanwhile, the reception terminal 110 may be configured to receive information data and may also be configured to transmit information data received before reception of the information data or other information data. The reception terminal 110 may be any terminal including a communication function, such as a smartphone, a tablet PC, or a laptop computer, and may be configured as a dedicated terminal used for the information transmission and reception system 100 including the apparatus having no QR identification module.

The server 120 serves to control a process in which information data are transmitted and received in the information transmission and reception system 100 including the apparatus having no QR identification module. The server 120 may perform all control necessary in the information transmission and reception system 100 including the apparatus having no QR identification module, such as communication connection, information data transmission and reception, and determination as to whether information data have been transmitted and received. The server 120 may be any apparatus capable of performing communication control, such as a mobile communication repeater or an Internet management apparatus, and may be configured as a dedicated apparatus or a server used for the information transmission and reception system 100 including the apparatus having no QR identification module.

The transmission terminal 130 having no QR identification module is a terminal configured to transmit information data in the information transmission and reception system 100 including the apparatus having no QR identification module. Meanwhile, the transmission terminal 130 having no QR identification module may be configured to transmit information data and may also be configured to receive information data transmitted before transmission of the information data or other information data. The transmission terminal 130 having no QR identification module may be any terminal including a communication function, such as a smartphone, a tablet PC, or a laptop computer, and may be configured as a dedicated terminal used for the information transmission and reception system 100 including the apparatus having no QR identification module.

Hereinafter, a process in which information data are transmitted and received in the information transmission and reception system 100 including the apparatus having no QR identification module will be described.

The reception terminal 110 may receive a first QR code from the transmission terminal 130 having no QR identification module, from which information data are to be received (S110). Here, the first QR code may include transmission terminal identification information. The transmission terminal identification information is information indicating unique information of a transmission terminal. The reception terminal 110 may receive the first QR code through a built-in camera or a QR code recognition module.

The reception terminal 110 may transmit the transmission terminal identification information to the server 120 (S120), and may receive encryption information of the transmission terminal 130 having no QR identification module from the server 120 (S130). The server 120 may receive the transmission terminal identification information transmitted by the reception terminal 110, and may specify the transmission terminal 130 having no QR identification module to transmit information data to the reception terminal 110. The server 120 may transmit the encryption information of the transmission terminal having no QR identification module, used when the transmission terminal 130 having no QR identification module transmits information, to the reception terminal 110. The encryption information of the transmission terminal 130 having no QR identification module may be information about a rule or an encryption program for encoding information when the transmission terminal 130 having no QR identification module transmits the information.

The reception terminal 110 may receive the encryption information of the transmission terminal having no QR identification module, and may transmit encryption information of the reception terminal to the server (S140). The encryption information of the reception terminal may be information about a rule or an encryption program for encoding information when the reception terminal 110 transmits the information. In addition, the encryption information of the reception terminal may include reception terminal identification information. The reception terminal identification information may not be included in the encryption information of the reception terminal, and may be separately transmitted.

The server may transmit the encryption information of the transmission terminal transmitted from the reception terminal 110 to the transmission terminal 130 having no QR identification module (S150).

The transmission terminal 130 having no QR identification module may acquire the encryption information of the reception terminal and the transmission terminal identification information from the server (S161). The transmission terminal 130 having no QR identification module may encode information data using the encryption information of the reception terminal 110 to create a second QR code (S162). The second QR code, which is a QR code of information data that the transmission terminal 130 having no QR identification module transmits the reception terminal 110, is created as the result of encryption using the encryption information of the reception terminal.

The transmission terminal 130 having no QR identification module may encode information data using the encryption information of the transmission terminal having no QR identification module and may transmit the encoded information data to the server simultaneously with creation of the second QR code (S163). The second QR code and the encoded information data are identical in content of the information data included therein to each other. However, the second QR code is encoded using encryption information of the reception terminal 130, whereas the encoded information data transmitted to the server are encoded using the encryption information of the transmission terminal having no QR identification module. As a result, the second QR code and the encoded information data are different in apparent content of data from each other.

The reception terminal 110 may recognize (receive) the second QR code displayed on the transmission terminal 130 having no QR identification module, and may decode the second QR code using decryption information of the reception terminal 110 to acquire information data (S164). The decryption information of the reception terminal 110 may be information about a rule or an encryption program for decoding the QR code or the information encoded using the encryption information of the reception terminal.

The reception terminal 110 may encode the decoded information data using the encryption information of the transmission terminal 130 having no QR identification module and may then transmit the encoded information data to the server (S170). The server may receive the encoded information data transmitted by the reception terminal 110 in this step (S170) and the encoded information data transmitted by the transmission terminal 130 having no QR identification module in step S163. The encoded information data transmitted by the reception terminal 110 and the encoded information data transmitted by the transmission terminal 130 having no QR identification module are encoded using the encryption information of the transmission terminal 130 having no QR identification module, whereby the encoded information data transmitted by the reception terminal and the encoded information data transmitted by the transmission terminal are the same.

The server 120 may determine whether the encoded information data transmitted by the reception terminal 110 and the encoded information data transmitted by the transmission terminal 130 having no QR identification module are the same, and may transmit the result of determination as to whether the data are the same to the reception terminal 110 and the transmission terminal 130 having no QR identification module (S180). Sameness determination of the server 120 may be performed by decoding the encoded information data. The server 120 decodes the encoded information data transmitted by the reception terminal 110 and the encoded information data transmitted by the transmission terminal 130 having no QR identification module using decryption information of the transmission terminal 130 having no QR identification module, and determines whether the decoded information data are the same. That is, each of the reception terminal 110 and the transmission terminal 130 encodes information data using the encryption information of the transmission terminal 130 and transmits the encoded information data to the server 120, and the server 130 decodes the encoded information data received by each of the reception terminal 110 and the transmission terminal 130 using the decryption information of the transmission terminal 130 to acquire the information data. To this end, the server 120 may store and manage the decryption information of the transmission terminal 130 in advance.

In the case in which the information data transmitted by the reception terminal 110 and the information data transmitted by the transmission terminal 130 having no QR identification module are the same, the server 120 may transmit information indicating that the information has been correctly transmitted to the reception terminal 110 and the transmission terminal 130 having no QR identification module. In the case in which the information has been correctly transmitted, each of the reception terminal 110, the server 120, and the transmission terminal 130 having no QR identification module may change the mode to an information transmission and reception standby state. In the case in which the information data transmitted by the reception terminal 110 and the information data transmitted by the transmission terminal 130 having no QR identification module are not the same, the server 120 may transmit information indicating that the information has not been correctly transmitted to the reception terminal 110 and the transmission terminal 130 having no QR identification module. The information indicating that the information has not been correctly transmitted may be transmitted in a state of including a reason for information transmission failure together with information transmission and reception failure. In the case in which the information has not been correctly transmitted, the reception terminal 110, the server 120, and the transmission terminal 130 having no QR identification module may reperform one of steps S110 to S170 in order to transmit and receive information data again or may reperform a transmission and reception process after the step that has been performed.

In the information transmission and reception system 100 including the apparatus having no QR identification module, the process of creating and transmitting the second QR code is substituted using the server 120 during the process of transmitting and receiving the information of the reception terminal 110. The information transmission and reception system 100 including the apparatus having no QR identification module is available in a conventional POS system having no QR identification module or having a limitation in using a camera (a general desktop PC or a terminal having a display device that has been already used), whereby it is possible to greatly secure extensibility. For example, the information transmission and reception system 100 including the apparatus having no QR identification module may be used when shopping, payment, and secure login are performed using a general monitor (a desktop PC), rather than a smartphone. Since the first QR code and the second QR code are displayed on a screen without installation of a separate security program and the QR codes are recognized using a user's smartphone, extensibility may be achieved while security is maintained, compared to a conventional system.

Hereinafter, components of the reception terminal 110, the server 120, and the transmission terminal 130 having no QR identification module included in the information transmission and reception system 100 including the apparatus having no QR identification module will be described, and the operation of each of the components will also be described.

FIG. 2 is view showing components of the reception terminal, the server, and the transmission terminal included in the information transmission and reception system using the QR code including the transmission terminal having no QR identification module according to the embodiment of the present invention.

The reception terminal 110 may include a QR scan module 111, an input and output unit (a touchscreen) 112, a control module 113, and a wireless communication module 114.

The QR scan module 111 of the reception terminal 110 is configured to scan a QR code having information therein.

The input and output unit (the touchscreen) 112 of the reception terminal 110 receives an output signal and outputs the received output signal as an image under control of the control module 113. Furthermore, the input and output unit (the touchscreen) 112 outputs an input signal generated by user touch to the control module 113, and the control module 113 performs an operation according to the input signal.

The control module 113 of the reception terminal 110 is configured to acquire encryption information, decryption information, and information data using information acquired by scanning the QR code and to display content indicating the same through the input and output unit (the touchscreen) 112.

The control module 113 of the reception terminal 110 may perform control such that the reception terminal 110 recognizes a first QR code including transmission terminal identification information from the transmission terminal, transmits the transmission terminal identification information to the server, receives encryption information of the transmission terminal based on the transmission terminal identification information from the server, transmits encryption information of the reception terminal to the server, receives a second QR code created using the encryption information of the reception terminal, the second QR code including information data, from the transmission terminal, decodes the second QR code using decryption information of the reception terminal to acquire the information data, encodes the information data using the encryption information of the transmission terminal 130 having no QR identification module and transmits the encoded information data to the server 120, and receives determination information as to whether the information data transmitted to the reception terminal 110 and the information data transmitted to the transmission terminal 130 having no QR identification module are the same from the server 120.

The wireless communication module 114 of the reception terminal 110 serves to transmit and receive information between the server 120 and the transmission terminal 130 having no QR identification module in an information transmission and reception process performed by the reception terminal 110.

The reception terminal 110 may be any one of a smartphone, a tablet PC, and a PMP, or may be configured as a dedicated terminal.

The transmission terminal 130 having no QR identification module may include an input and output unit (a touchscreen) 131, a control module 132, and a wireless communication module 133.

The input and output unit (the touchscreen) 131 of the transmission terminal 130 having no QR identification module receives an output signal and outputs the received output signal as an image under control of the control module 132. Furthermore, the input and output unit (the touchscreen) 131 outputs an input signal generated by user touch to the control module 132, and the control module 132 performs an operation according to the input signal.

The control module 132 of the transmission terminal 130 having no QR identification module is configured to acquire encryption information, decryption information, and information data using information acquired by scanning the QR code and to display content indicating the same through the input and output unit (the touchscreen) 131.

The control module 132 of the transmission terminal 130 having no QR identification module may perform control such that the transmission terminal 130 having no QR identification module transmits a first QR code including transmission terminal identification information to the reception terminal 110, acquires reception terminal identification information and encryption information of the reception terminal from the server based on the first QR code, encodes information data using the encryption information of the reception terminal and transmits the same to the first terminal, encodes information data using encryption information of the transmission terminal and transmits the same to the server, and receives determination information as to whether the information data transmitted to the reception terminal 110 and the information data transmitted to the transmission terminal 130 having no QR identification module are the same from the server 120.

The wireless communication module 134 of the transmission terminal 130 having no QR identification module serves to transmit and receive information between the server 120 and the reception terminal 110 in a simple information transmission and reception process performed by the transmission terminal 130 having no QR identification module.

The transmission terminal 130 having no QR identification module may be any one of a smartphone, a tablet PC, and a PMP, or may be configured as a dedicated terminal.

Next, the server 120 may include a controller and a communication module.

Hereinafter, the operation of each of the reception terminal 110 and the transmission terminal 130 having no QR identification module of the information transmission and reception system 100 including the apparatus having no QR identification module will be described.

FIG. 3 is view showing the operation of the reception terminal of the information transmission and reception system using the QR code including the transmission terminal having no QR identification module according to the embodiment of the present invention.

The reception terminal 110 may recognize a first QR code including transmission terminal identification information from the transmission terminal (S310).

The reception terminal 110 may transmit the transmission terminal identification information to the server (S320).

The reception terminal 110 may receive encryption information of the transmission terminal based on the transmission terminal identification information from the server (S330).

The reception terminal 110 may transmit encryption information of the reception terminal to the server (S340).

The reception terminal 110 may receive a second QR code created using the encryption information of the reception terminal and including information data from the transmission terminal (S350).

The reception terminal 110 may encode the information data using the encryption information of the transmission terminal and may transmit the encoded information data to the server 120 (S360).

The reception terminal 110 may receive determination information as to whether the information data transmitted to the reception terminal 110 and the information data transmitted to the transmission terminal 130 having no QR identification module are the same from the server 120 (S370). In the case in which the determination information as to whether the information data are the same, received from the server 120, indicates that the information data have been correctly transmitted, the reception terminal 110 may change the mode to an information transmission and reception standby state. In the case in which the determination information as to whether the information data are the same, received from the server 120, indicates that the information data transmitted by the reception terminal 110 and the information data transmitted by the transmission terminal 130 having no QR identification module are not the same, the reception terminal 110 may receive the same in a state of including a reason for information transmission failure together with information transmission and reception failure, and the reception terminal 110 may reperform one of steps S110 to S170 in order to receive information data again or may reperform a reception process after the step that has been performed.

FIG. 4 is view showing the operation of the transmission terminal of the information transmission and reception system using the QR code including the transmission terminal having no QR identification module according to the embodiment of the present invention.

The transmission terminal 130 having no QR identification module may transmit a first QR code including transmission terminal identification information to the reception terminal 110 (S410).

The transmission terminal 130 having no QR identification module may receive reception terminal identification information and encryption information of the reception terminal from the server (S420).

The transmission terminal 130 having no QR identification module may encode information data using the encryption information of the reception terminal to create a second QR code (S430).

The transmission terminal 130 having no QR identification module may encode information data using encryption information of the transmission terminal and may transmit the encoded information data to the server (S440).

The transmission terminal 130 having no QR identification module may transmit the second QR code to the reception terminal 110 (S450).

The transmission terminal 130 having no QR identification module may receive determination information as to whether the information data transmitted to the reception terminal 110 and the information data transmitted to the transmission terminal 130 having no QR identification module are the same from the server 120 (S460). In the case in which the determination information as to whether the information data are the same, received from the server 120, indicates that the information data have been correctly transmitted, the transmission terminal 130 having no QR identification module may change the mode to an information transmission and reception standby state. In the case in which the determination information as to whether the information data are the same, received from the server 120, indicates that the information data transmitted by the reception terminal 110 and the information data transmitted by the transmission terminal 130 having no QR identification module are not the same, the transmission terminal 130 having no QR identification module may receive the same in a state of including a reason for information transmission failure together with information transmission and reception failure, and the transmission terminal 130 having no QR identification module may reperform one of steps S110 to S170 in order to transmit information data again or may reperform a transmission process after the step that has been performed.

In the case in which information data to be transmitted is payment information, the information transmission and reception system 100 including the apparatus having no QR identification module may be used as a simple payment system. The simple payment system is configured to allow a user to scan QR codes provided at goods in an online/offline store using a user terminal without a separate credit card in order to acquire goods/payment information. A payment server may receive only a destination without a separate sign-up/login procedure, and may complete payment through a payment process by a credit card company or a mobile communication company using credit card information or a smartphone number pre-registered in the user terminal. It is not necessary for the user to carry any credit card and to receive a paper receipt, whereby this system is very convenient and environmentally friendly. Also, in an offline store, no card inquiry machine is needed, and QR codes provided at goods may be used. In addition, the payment server performs payment without a separate sign-up/login procedure, whereby there is no danger of personal information leakage.

The simple payment system may include a user terminal, a payment server, and a payment terminal. The simple payment system may correspond to the information transmission and reception system 100 including the apparatus having no QR identification module. That is, the user terminal may correspond to the reception terminal 110, the payment server may correspond to the server 120, and the payment terminal may correspond to the transmission terminal 130 having no QR identification module. The user terminal, the payment server, and the payment terminal may perform all operations of the reception terminal 110, the server 120, and the transmission terminal 130 having no QR identification module.

In the simple payment system or the information transmission and reception system 100 including the apparatus having no QR identification module according to the present invention, a "public-key cipher algorithm" using different keys at the time of encryption and decryption may be used.

The "public-key cipher algorithm" is called an asymmetric-key cipher algorithm due to the characteristics thereof in that different keys are used at the time of encryption and decryption. In the "public-key cipher algorithm," two keys are created through a key creation algorithm, one of the keys is published as if telephone numbers were published in a telephone directory, and the other key is kept and used by a user as a private key. For example, in the case in which A transmits a document to B, A encodes the document using a public key of B, and B decodes the received document using their private key. Consequently, it is sufficient for a user of the "public-key cipher algorithm" only to manage their private key irrespective of the number of people with whom the user wishes to exchange information even in the case in which the number of people is increased.

A representative example of the "public-key cipher algorithm" is a Rivest-Shamir-Adleman (RSA) algorithm. In the RSA algorithm, a private key and a public key are created using a predetermined key creation algorithm. In the RSA algorithm, the private key and the public key are generally selected through the following process.

First, two large prime numbers p and q are chosen, the prime numbers p and q are used as two private keys, and the product of the two numbers p*q is selected as a public key n. Subsequently, the public key n is applied to Euler's formula, and an arbitrary integer e that is primed by the result value $\mathcal{f}(n)$ is selected as another public key 3. Finally, a number d that satisfies Mathematical Expression 1 is calculated using a Euclidean algorithm, and the number d is selected as a private key together with the two prime numbers p and q.

$$e \cdot d \equiv 1 (\bmod \; \mathcal{f}(n)) \quad \text{[Mathematical Expression 1]}$$

Hereinafter, the construction of an information transmission and reception system using a QR code in inter-terminal communication will be described in detail.

FIG. 5 is view showing an information transmission and reception system using a QR code in inter-terminal communication according to an embodiment of the present invention.

Referring to FIG. 5, the information transmission and reception system 200 using the QR code in inter-terminal communication according to the embodiment of the present invention (hereinafter referred to as an "information transmission and reception system using a QR code between terminals") may include a reception terminal 210 and a transmission terminal 220.

In the present invention, inter-terminal communication, which is communication between devices, means a communication system in which devices located near each other are capable of performing direct telephone conversation with each other and transmitting and receiving information to and from each other without the aid of radio relay equipment. A communication system capable of allowing telephone conversation to be performed even in the case in which radio relay equipment, such as a base station, is not properly operated or is absent is an example of inter-terminal communication. "LTE D2D" technology, which is a recent example of inter-terminal communication, is capable of allowing communication devices within a short distance to communicate with each other using LTE. LTE D2D seeks to create various new services, such as a location-based social network service (SNS), transmission of specific area crime information, new types of mobile advertisement, and inter-vehicle communication. Since inter-device communication is maintained even in the case in which a base station in a specific area is not abruptly operated, this technology is expected to be used for a public service, such as notification of a disaster. Inter-terminal communication in the present invention may be comprehended as including all kinds of inter-terminal communication and inter-device communication that are currently available or will be available in future, including D2D communication.

The information transmission and reception system 200 using the QR code between terminals is configured to scan a QR code such that the reception terminal 210 acquires information data transmitted from the transmission terminal 220. The information transmission and reception system 200 using the QR code between terminals may transmit not only information data but also information used to transmit and receive the information data during an information transmission and reception process.

The reception terminal 210 is a terminal configured to receive information data in the information transmission and reception system 200 using the QR code between terminals. Meanwhile, the reception terminal 210 may be configured to receive information data and may also be configured to transmit information data received before reception of the information data or other information data. The reception terminal 210 may be any terminal including a communication function, such as a smartphone, a tablet PC, or a laptop computer, and may be configured as a dedicated terminal used for the information transmission and reception system 200 using the QR code between terminals.

The transmission terminal 220 is a terminal configured to transmit information data in the information transmission and reception system 200 using the QR code between terminals. Meanwhile, the transmission terminal 220 may be configured to transmit information data and may also be configured to receive information data transmitted before transmission of the information data or other information data. The transmission terminal 220 may be any terminal including a communication function, such as a smartphone, a tablet PC, or a laptop computer, and may be configured as a dedicated terminal used for the information transmission and reception system 200 using the QR code between terminals.

The information transmission and reception system 200 using the QR code between terminals may be configured to include no server. Consequently, the information transmission and reception system 200 using the QR code between terminals is applicable to a field in which data processing using the QR code between terminals is necessary without the intervention of a server.

The reception terminal 210 may recognize a first QR code of the transmission terminal 220 (S510). The reception terminal 210 may recognize the first QR code in order to receive transmission terminal identification information corresponding to the transmission terminal 220.

The reception terminal 210 may receive the transmission terminal identification information, and may create a second QR code including reception terminal identification information to be transmitted to the transmission terminal 220 (S520).

The reception terminal 210 may transmit the created second QR code to the transmission terminal 220 (S530).

The transmission terminal 220 may recognize (receive) the second QR code created by the reception terminal 210 through a QR scan module or a camera of the transmission terminal 220 to acquire the reception terminal identification information (S540).

The transmission terminal 220 may create a third QR code including transmission data to be transmitted to the reception terminal 210 using the reception terminal identification information (S550).

The transmission terminal 220 may transmit the third QR code to the reception terminal 210 (S560). The reception terminal 210 may receive the third QR code and may acquire the transmission data included in the third QR code.

The information transmission and reception system 200 using the QR code in inter-terminal communication may be used in a field in which data processing using the QR code between terminals is necessary without the intervention of a server. In addition, the information transmission and reception system 200 using the QR code in inter-terminal communication may be applicable to a field in which encryption is omitted and thus no security is necessary. Consequently, the information transmission and reception system 200 using the QR code in inter-terminal communication may be alternatively utilized in a field in which security is used for access authentication or login using a simple bidirectional data transmission and reception method or in a field in which there is a limitation in using wireless short range communication (NFC or RFID).

In the information transmission and reception system 200 using the QR code in inter-terminal communication, an "identification code" that sets the type of data may be included in the first QR code or the second QR code, and this identification code may provide the type of data, such as "URL," "ID," or "HASH," to the reception terminal 210 in advance. This identification code is applicable such that transmission and reception devices are authorized in advance to selectively read only allowed data (the identification code is applicable to security reinforcement for delegation of access, as in OAuth, which is public technology). The information transmission and reception system 200 using the QR code in inter-terminal communication is capable of being utilized as a means for secondary authentication, since only identification information is not encoded but data can be transmitted and received in an encoded state.

Hereinafter, components of the reception terminal 210 and the transmission terminal 220 included in the information transmission and reception system 200 using the QR code in inter-terminal communication will be described, and the operation of each of the components will also be described.

FIG. 6 is view showing components of the reception terminal and the transmission terminal included in the information transmission and reception system using the QR code in inter-terminal communication according to the embodiment of the present invention.

First, the reception terminal 210 may include a QR scan module 211, an input and output unit (a touchscreen) 212, a control module 213, and a wireless communication module 214.

The QR scan module 211 of the reception terminal 210 is configured to scan a QR code having information therein.

The input and output unit (the touchscreen) 212 of the reception terminal 210 receives an output signal and outputs the received output signal as an image under control of the control module 213. Furthermore, the input and output unit (the touchscreen) 212 outputs an input signal generated by user touch to the control module 213, and the control module 213 performs an operation according to the input signal.

The control module 213 of the reception terminal 210 is configured to acquire information used for information transmission and reception and information data using information acquired by scanning the QR code and to display content indicating the same through the input and output unit (the touchscreen) 212.

The control module 213 of the reception terminal 210 may perform control such that the reception terminal 210 recognizes a first QR code including transmission terminal identification information from the transmission terminal 220, creates a second QR code including reception terminal identification information and transmits the created second QR code to the transmission terminal 220, and receives a third QR code including information data from the transmission terminal 220 to acquire the information data.

The wireless communication module 214 of the reception terminal 210 serves to transmit and receive information to and from the transmission terminal 220 in an information transmission and reception process performed by the reception terminal 210.

The reception terminal 210 may be any one of a smartphone, a tablet PC, and a PMP, or may be configured as a dedicated terminal.

The transmission terminal 220 may include a QR scan module 221, an input and output unit (a touchscreen) 222, a control module 223, and a wireless communication module 224.

The QR scan module 221 of the transmission terminal 220 is configured to scan a QR code having information therein.

The input and output unit (the touchscreen) 222 of the transmission terminal 220 receives an output signal and outputs the received output signal as an image under control of the control module 223. Furthermore, the input and output unit (the touchscreen) 222 outputs an input signal generated by user touch to the control module 223, and the control module 223 performs an operation according to the input signal.

The control module 223 of the transmission terminal 220 is configured to acquire information used for information transmission and reception and information data using information acquired by scanning the QR code and to display content indicating the same through the input and output unit (the touchscreen) 222.

The control module 223 of the transmission terminal 220 may perform control such that the transmission terminal 220 transmits a first QR code including transmission terminal identification information to the reception terminal 210, receives a second QR code including reception terminal identification information based on the first QR code, and transmits information data to the transmission terminal 220.

The wireless communication module 224 of the transmission terminal 220 serves to transmit and receive information to and from the reception terminal 210 in a simple information transmission and reception process performed by the transmission terminal 220.

The transmission terminal 220 may be any one of a smartphone, a tablet PC, and a PMP, or may be configured as a dedicated terminal.

Hereinafter, the operation of each of the reception terminal 210 and the transmission terminal 220 of the information transmission and reception system 200 using the QR code between terminals will be described.

FIG. 7 is view showing the operation of the reception terminal of the information transmission and reception system using the QR code between terminals according to the embodiment of the present invention.

The reception terminal 210 may recognize a first QR code including transmission terminal identification information from the transmission terminal (S720).

The reception terminal 210 may create a second QR code including reception terminal identification information (S730).

The reception terminal 210 may transmit the second QR code to the transmission terminal 220 (S730).

The reception terminal 210 may receive a third QR code including transmission data from the transmission terminal (S740).

The reception terminal 210 may receive information data through the third QR code (S750).

FIG. 8 is view showing the operation of the transmission terminal of the information transmission and reception system using the QR code in inter-terminal communication according to the embodiment of the present invention.

The transmission terminal 220 may transmit a first QR code including transmission terminal identification information from the reception terminal 210 (S810).

The transmission terminal 220 may receive a second QR code including reception terminal identification information from the reception terminal 210 (S820).

The transmission terminal 220 may acquire the reception terminal identification information (S830).

The transmission terminal 220 may create a third QR code including transmission data to be transmitted to the reception terminal 210 (S840).

The transmission terminal 220 may transmit the third QR code to the reception terminal 210 (S850).

The steps of the method or the algorithm described in connection with the embodiments of the present invention may be directly implemented by hardware, may be implemented by a software module that is executed by hardware, or may be implemented by a combination thereof. The software module may be provided in a random access memory (RAM), a read only memory (ROM), an erasable programmable ROM (EPROM), an electrically erasable programmable ROM (EEPROM), a flash memory, a hard disk, a removable disk, a CD-ROM, or any type of computer-readable recording medium well known in the art to which the present invention pertains.

While the embodiments of the present invention have been described above with reference to the accompanying drawings, those skilled in the art to which the present invention pertains will appreciate that the present invention may be easily embodied in specific forms other than those set forth herein without departing from the technical idea and essential characteristics of the present invention. The above embodiments are therefore to be construed in all aspects as illustrative and not restrictive.

What is claimed is:

1. An information transmission and reception method using a QR code, the information transmission and reception method comprising:
    transmitting a first QR code comprising identification information of a second terminal;
    receiving first code information, the first code information being information obtained by encoding encryption information of a first terminal using encryption information of the second terminal based on the first QR code;
    decoding the first code information using decryption information of the second terminal to acquire the encryption information of the first terminal;
    encoding information data using the encryption information of the first terminal to create encoded information data;
    creating a second QR code based on the encoded information data;
    transmitting the second QR code to the first terminal;
    encoding the information data using the encryption information of the second terminal and transmitting the encoded information data to a server; and
    receiving determination information from the server, wherein
    the determination information is determination information as to whether the information data transmitted from the first terminal to the server and the information data transmitted from the second terminal to the server are identical to each other, and the receiving determination information from the server comprises:

decoding, by the server, the information data received from the first terminal using the decryption information of the second terminal; and decoding, by the server, the information data received from the second terminal using the decryption information of the second terminal.

2. The information transmission and reception method according to claim 1, further comprising:

confirming that the information data are correctly received in a case in which the determination information as to whether the information data are identical to each other indicates that the information data are identical to each other; and confirming that the information data are not correctly received in a case in which the determination information as to whether the information data are identical to each other indicates that the information data are not identical to each other.

3. The information transmission and reception method according to claim 2, further comprising transmitting the first QR code from the first terminal again in a case in which the information data are not correctly received.

* * * * *